(No Model.)

G. W. McALISTER.
HORSE DETACHER.

No. 477,775. Patented June 28, 1892.

Witnesses.
A. Ruppert.
H. A. Daniels

Inventor:
Geo. W. McAlister,
Per
Thomas P. Simpson,
Atty.

UNITED STATES PATENT OFFICE.

GEORGE W. McALISTER, OF JAKE'S PRAIRIE, MISSOURI.

HORSE-DETACHER.

SPECIFICATION forming part of Letters Patent No. 477,775, dated June 28, 1892.

Application filed February 29, 1892. Serial No. 423,298. (No model.)

*To all whom it may concern:*

Be it known that I, GEORGE W. MCALISTER, a citizen of the United States, residing at Jake's Prairie, in the county of Crawford and State of Missouri, have invented certain new and useful Improvements in Horse-Detachers; and I do hereby declare the following to be a full, clear, and exact description of the invention, such as will enable others skilled in the art to which it appertains to make and use the same.

The special object of the invention is to make a horse-detacher which will at once liberate the horse and thills from the vehicle as soon as the driver discovers the horse to be unmanageable, the mere liberation of the traces from the whiffletrees being found to be often ineffective, as the horse becomes entangled in the harness, which will not disengage from the thills, and plunges and kicks, to the great detriment of the vehicle and the danger of its inmates.

Figure 1:
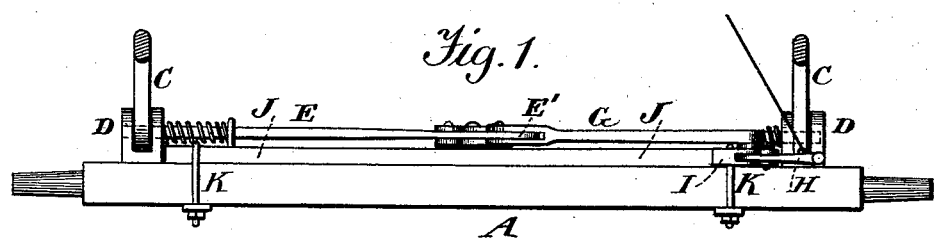
Figure 2:
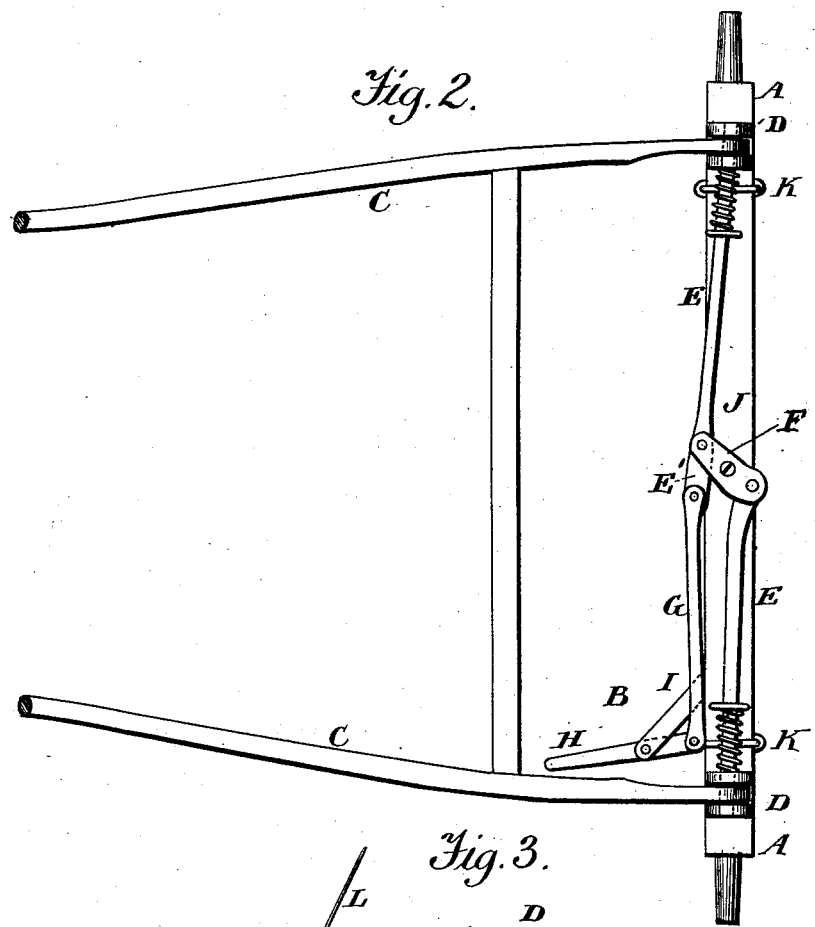
Figure 3:
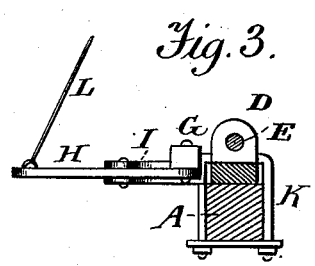

Figure 1 of the drawings is a front elevation showing the invention applied; Fig. 2, a plan view of the means by which the spring-bolts are withdrawn, and Fig. 3 a vertical cross-section.

In the drawings, A represents the front axle of a vehicle; B, the part of body in front of the seat, and C the thills, which connect with the axle by means of the eyes D D and spring-bolts E E, which are often employed to connect the traces with the whiffletree, the said bolts being pivoted to an equal-armed lever F, which is turned by some mechanism brought within reach of the driver. These devices are therefore old and well known in horse-detachers.

I have taken the eyes D, spring-bolts E, and equal-armed lever, used them for connecting the thills with the axle, and made the following additions thereto: One of the spring-bolts is extended at E', and to this is attached the pitman G by a pivot, the other end of the pitman being pivoted to a lever H, fulcrumed between the ears of an inclined post I. The latter rises from a plate J, which is held by the clips K K to the axle. The upper end of the lever H is provided with a cord L, brought within easy reach of the driver.

I am aware that it is not new to combine a swinging equal-armed lever fulcrumed on the doubletree-pivot with pivoted rods to move sliding sleeves on the ends of doubletrees for the purpose of locking or unlocking trace-hooks; but

What I claim as new, and desire to protect by Letters Patent, is—

The combination, with the thills of a vehicle and an axle having on its upper face the eyes D D D D, of the spring-bolts E E, middle-fulcrumed lever F, levers G H, and brace I, one of said levers G H being end-pivoted to an extension E' of one of the spring-bolts, as and for the purpose set forth.

In testimony whereof I affix my signature in presence of two witnesses.

GEORGE W. McALISTER.

Witnesses:
 B. H. ANDERSON,
 A. J. PINNELL.